United States Patent [19]

Hemfort

[11] 4,147,293

[45] Apr. 3, 1979

[54] CONTINUOUSLY OPERATING SOLID-JACKET COUNTERFLOW CENTRIFUGAL EXTRACTOR

[75] Inventor: Heinrich Hemfort, Oelde, Fed. Rep. of Germany

[73] Assignee: Westfalia Separator AG, Oelde, Fed. Rep. of Germany

[21] Appl. No.: 868,552

[22] Filed: Jan. 11, 1978

[30] Foreign Application Priority Data

Jan. 18, 1977 [DE] Fed. Rep. of Germany ....... 2701763

[51] Int. Cl.² ............................ B04B 1/20; B04B 5/06
[52] U.S. Cl. .......................................... 233/7; 233/15
[58] Field of Search ................ 233/15, 7, 14 R, 23 R, 233/46, 47 R, 27, 28, 1 D; 415/18; 366/222, 224

[56] References Cited

U.S. PATENT DOCUMENTS

| | | | |
|---|---|---|---|
| 2,528,974 | 11/1950 | Ritsch | 233/14 X |
| 3,052,401 | 9/1962 | Thylefors | 233/19 R |
| 3,494,542 | 2/1970 | Craig et al. | 233/7 |
| 3,802,621 | 4/1974 | Merzenich | 233/7 |
| 3,934,792 | 1/1976 | High et al. | 233/7 |
| 3,971,509 | 7/1976 | Johnsen | 233/7 |

FOREIGN PATENT DOCUMENTS

| | | | |
|---|---|---|---|
| 647761 | 8/1964 | Belgium | 233/7 |
| 496031 | 6/1954 | Italy | 233/7 |

Primary Examiner—George H. Krizmanich
Attorney, Agent, or Firm—Sprung, Felfe, Horn, Lynch & Kramer

[57] ABSTRACT

A continuously operating counterflow centrifugal extractor suitable for liquid-liquid extractions wherein solids can be separated with the heavier phase. The extractor (FIG. 1) includes a horizontally disposed drum 8, 9 rotated by pulley 15 which is mounted on hollow shaft extension 6. A transport screw 10 is mounted on a shaft 11 and is rotated by forces developed in the liquid at a rate different than the rate of rotation of the drum. The two liquids are introduced into opposite ends of a mixing zone A. After mixing the heavier phase passes through clarification zone C to outlet 20 and the lighter phase passes through the clarification zone B and on to pump 21 which is mounted on shaft 11 and rotates with the transport screw 10. The difference in rotation rates can be controlled by operation of a throttle 27.

18 Claims, 3 Drawing Figures

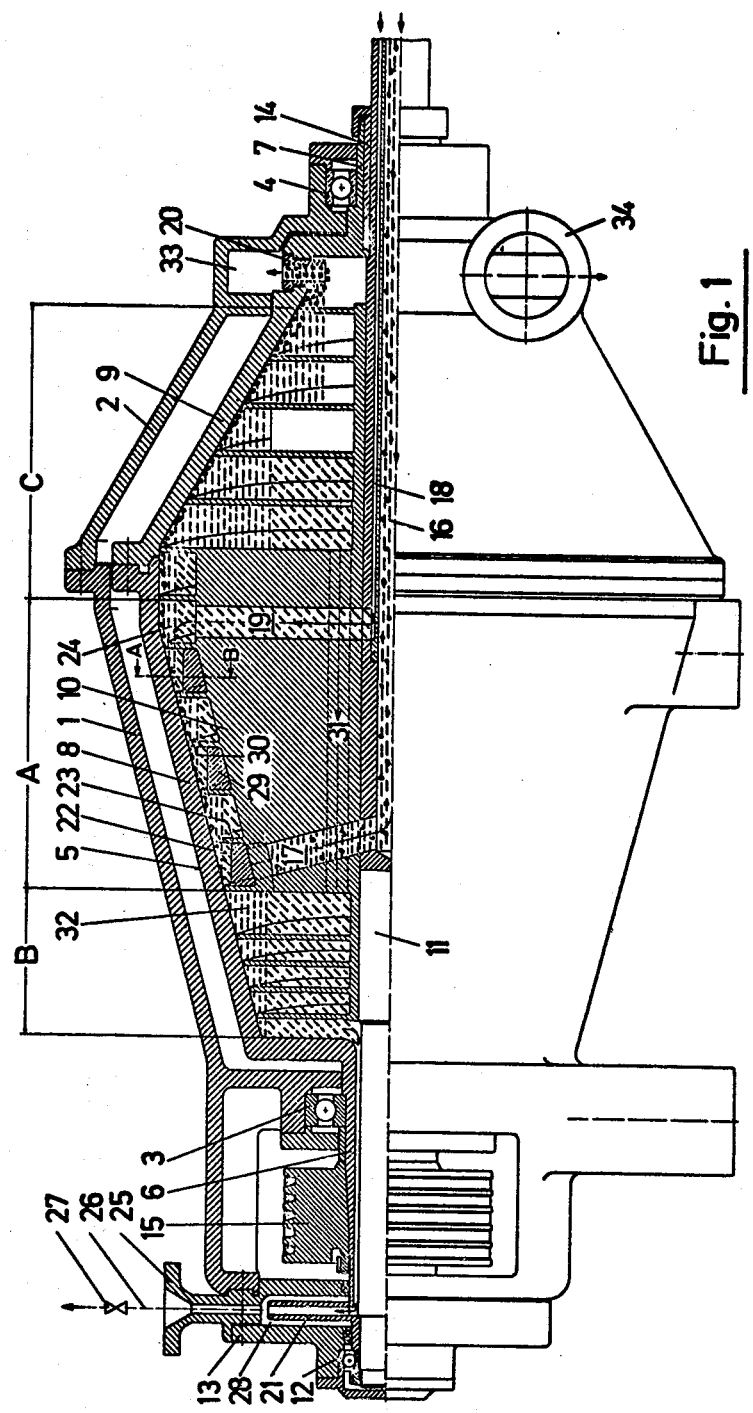

CONTINUOUSLY OPERATING SOLID-JACKET COUNTERFLOW CENTRIFUGAL EXTRACTOR

BACKGROUND

The invention relates to a continuously operating, solid-jacket counterflow centrifugal extractor for the mixing together and separation of two liquids, having a centrifuge drum rotatable about a horizontal axis, provided with a mixing and contact zone between the two clarification zones, as well as separate inflows for carrying the liquids into the mixing and contact zone, and separate outflows leading away from the clarification zones.

A counterflow centrifugal extractor of this kind is known, for example, from German Auslegeschrift 10 37 417.

Counterflow centrifugal extractors are used for the purpose of transferring a dissolved extract contained in liquids from these liquids to liquid extractants in which the extract must be more soluble than it is in the liquid containing it. The transfer of the substance from the aqueous, extract-containing liquid to the extractant additionally presupposes a thorough mixing together or an intimate contact between the two liquids for the purpose of obtaining a high extraction yield. It is furthermore known that the number of extraction stages that can be achieved, and thus the extraction yield, is especially great, and the extraction can be performed with the least amount of extractant when the extraction process is performed countercurrently in the mixing and contact zone. Counterflow centrifugal extractors are preferred for liquid-to-liquid extraction, since the extraction of liquids containing solids leads to a rapid clogging of the extraction drums with sludge, so that they have to be shut down and cleaned, which requires a great deal of time and effort. To lengthen the running time of the extractors the solid-containing liquid, e.g., the culture broth used in the production of antibiotics, can be filtered to separate the solid components before the extraction.

The disadvantage of this method, in addition to the expense involved in the additional filtration, is that the solid components separated in the filtration are not subjected to the extraction and a great deal of extract is lost in the unextracted, moist solid matter.

German Auslegeschrift 10 37 417 shows a counterflow extractor in which the specifically lighter liquid is fed under higher pressure into the outer mixing and contact zone and the specifically heavier liquid is fed into the inner mixing and contact zone; the two liquids are carried countercurrently through a spirally disposed passage which is provided, for example, with holes to improve contact between the liquids.

While the specifically heavier liquid is being reclarified in a chamber in the outer area of the drum and being carried out of same, the specifically lighter liquid flows toward the axis of the extractor into an inner chamber for reclarification, and is again carried out of same.

The outer chamber additionally has a wall extending away from the axis at an angle, which reaches outwardly as far as the outlet for the heavier, solids-carrying liquid for the purpose of removing the centrifugally concentrated solids together with the specifically heavier liquid.

In this extractor, it is a disadvantage that only those solids can be carried out continuously with the specifically heavier liquid, which are either of lighter consistency or are able to be kept in suspension with the liquid and carried out in suspension form. This type of centrifugal extractor, however, is not suitable for discharging continuously solids which are of greater specific gravity than the specifically heavier liquid and which occur in relatively large quantities.

One-stage extractors are also known which are equipped, for example, with self-emptying centrifuge drums, the solids being carried out intermittently, but, for a great number of extraction processes, this one-stage extraction is not sufficient for achieving the desired extraction yield.

Therefore a plurality of one-stage extractors are connected in tandem and the liquid is conducted countercurrently in order to arrive at the desired number of stages and yield. Since in this method of operation, the solid matter which is centrifuged out and comminuted in this manner is fed to the next machine and has to be mixed with the rest of the liquid, emulsions are very frequently produced which can be separated but very poorly in the extractor, or only at additional expense, e.g., through the addition of wetting agents.

THE INVENTION

Now, it is the object of the invention to construct a counterflow centrifugal extractor such that liquids even containing solids of greater specific gravity can be subjected to extraction, and such that the solid matter as well as the liquids can be carried out of the extractor continuously.

This object is achieved in accordance with the invention in that the centrifuge drum of the extractor has at least one drum barrel tapering towards the side at which the specifically heavier liquid and solids are put out, and a likewise tapering transport screw disposed coaxially therein and revolving at a different speed than the drum barrel, and that between the spirals of the transport screw, a plurality of contact points are disposed in the mixing and contact zone.

The construction of the extractor in accordance with the invention makes it possible to process in an undisturbed manner extract-containing liquids having a very high content of solids and solids of higher specific weight, the spirals of the transport screw revolving at a different rotatory speed from the drum barrel continuously removing from the extractor the solids and the specifically heavier liquid.

In a special embodiment of the extractor, a special drying zone is provided for the solids in the drum, so that the solid matter is additionally separated from the specifically heavier liquid and is removed in dry form. The contact between the extractant and the solid-containing liquid under extraction, which is necessary for the achievement of a greater number of extraction stages, and the high extraction yield thereby achievable, is accomplished by means of the transport screw revolving at a different rotatory speed from the drum barrel and by means of a number of contact areas and bores between the spirals to provide for a sufficient turbulence in the mixing and contact area, i.e., the specifically heavier liquid and the solids are brought into effective contact with the specifically light extractant on the way from the inlet to the outlet by continuous turbulence within the contact zone. The difference in the rotatory speed can be obtained, for example, by means of a planetary gear or a variable-speed transmission.

In a special embodiment of the extractor, the discharge of the specifically lighter extractant is accomplished by means of a discharge pump connected to the transport screw, disposed in a sealed pumping chamber, so that the differential rotatory speed and hence the effective contact between the liquids can be regulated during operation by means of a throttling member in the extractant discharge line.

An example of the embodiment of the invention is represented in the drawing, wherein:

FIG. 1 is a partial vertical longitudinal cross section taken through the centrifugal extractor.

Figure 3:
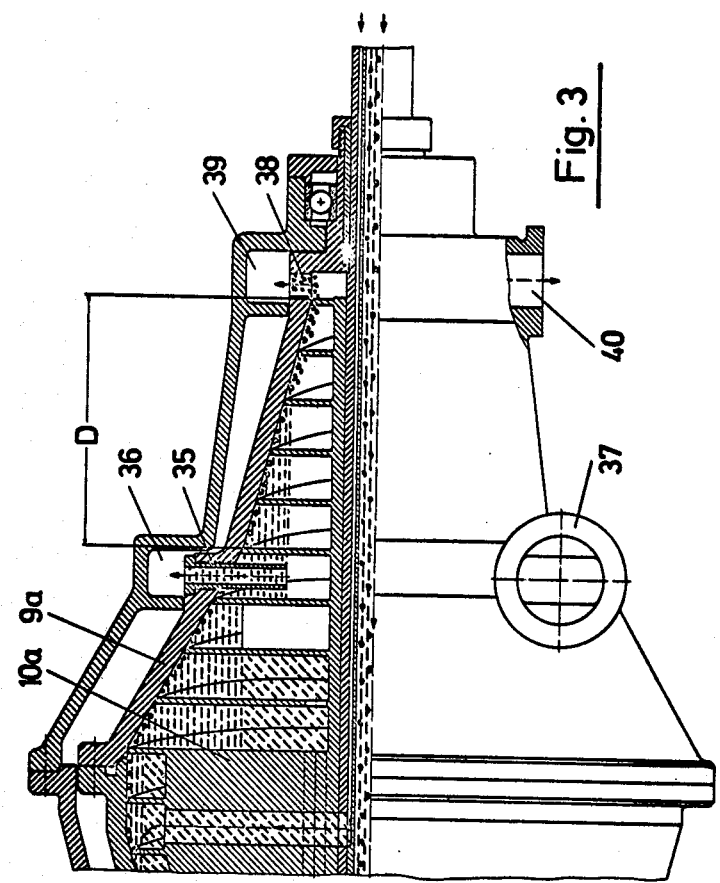
FIG. 3 is a partial longitudinal section taken through the right half of the centrifugal extractor showing a drying zone for the solids.

The counterflow centrifugal extractor of FIG. 1 consists of an extractor stand consisting of the casing parts 1 and 2, on which an extraction drum 5 having a horizontal longitudinal axis is rotatably mounted in ball bearings 3 and 4. The drum is bipartite in construction, and has two coaxial, conical, narrower extremities 6 and 7, constructed as shafts, and facing outwardly, and having drum barrel parts 8 and 9 of different length affixed to one another at their wider ends. Within the drum 5 there is provided, in accordance with the invention, a matching conical transport screw 10 which is fastened to a shaft 11. The shaft of the transport screw is rotatably mounted on an additional ball bearing 12 in a bearing housing 13 fastened to the centrifuge casing 1, and on a friction bearing 14 within the hollow shaft 7 of the drum. The drum is driven, for example, by an electric motor, which is not shown, through a V-belt pulley 15 affixed to the shaft-like projection 6 of the drum barrel 8, and is brought to a predetermined rotatory speed.

The extractor consists of a mixing and contact zone A for the exchange of substances, the clarification zone B for the reclarification of the specifically lighter liquid (extractant), and the clarification zone C for the reclarification of the specifically heavier liquid. The shaft 11 with the transport screw 10 affixed to it is provided with a bore 16 for the feeding of the specifically heavier, solid-containing liquid under extraction, which bore communicates through one or more passages 17 in the transport screw with the one end of the mixing and contact zone A, and is provided with one or more passages 18 for the feeding of the specifically lighter liquid, which lead into one or more holes 19 in the transport screw which communicate with the other end of the mixing and contact zone. At the end of the clarification zone C there is disposed an adjustable outlet 20 for the discharge of the specifically heavier liquid and of the solids and for the establishment of the separating zone between the two liquids, and at the end of the clarification zone B there is disposed a pump 21 for the discharge of the specifically lighter liquid.

The extractor operates in the following manner: After the extractor has been brought to full rotatory speed, the extractor is charged through bore 16 in shaft 11 with the specifically heavier liquid containing the extract which is to be extracted; this liquid flows through the passage 17, and arrives at the first screw spiral 22 of the mixing and contact zone A and flows within the spirals 23 of the transport screw extending over the entire range of the drum towards the outlet 20. Under the action of the liquid subjected to centrifugal force, the transport screw is brought to approximately the same rotatory speed as the drum barrel, and the coarser and specifically heavier solids are thrown to the periphery of the drum within the screw spirals. After the extractant (specifically light liquid) has been forced in under pressure through the passages 18 and bores 19 into the screw spiral 24, the extractant flows within the spirals 23 of the transport screw towards the discharge pump 21 and is discharged through the discharge connection 25 and line 26 equipped with the valve 27. As soon as the throttling of the valve 27 produces a backing up of liquid within the pump chamber 28 and pump 21 is rotating in the discharged extractant, the liquid friction between the rotating pump and the stationary bearing housing 13 continually retards the transport screw 10 connected to and rotating with the pump, so that a rotatory speed is established which is different from that of the revolving drum barrel, and this brings it about that the solids settling between the spirals of the transport screw are advanced towards the outlet 20 for the specifically heavier liquid and are discharged. By changing the depth of immersion of pump 21 in the extractant by throttling the valve 27, the differential rotatory speed can be controlled during operation.

Between the spirals, in the area of the mixing and contact zone A, replaceable segments or fillers 29 are disposed, and bores 30 are disposed at the periphery of the spirals, and these, in conjunction with the difference in speed between the screw and the drum jacket, promote effective mixing and contact between the extractant and the liquid under extraction, and the transfer of the extract from the specifically heavier liquid to the extractant takes place.

The extractant flowing out of the mixing and contact zone and enriched with extract is reclarified in the area of the clarification zone B within the screw spirals, any amounts of specifically heavier liquid and solids being flung to the periphery of the drum jacket and transported by the spirals towards the discharge 20. The spent specifically heavier liquid flowing out of the mixing and contact zone, and the removed solid matter, are reclarified in the clarification zone C, any extractant present being separated and carried through passage 31 to the first spiral 32 of the clarification zone B. The spent, specifically heavier liquid and the solid matter are carried away through discharge 20, annular passage 33, and discharge connection 34.

Figure 2:
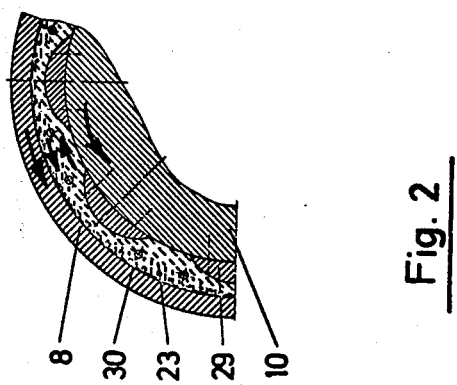
FIG. 2 is a fragmentary cross sectional view taken through FIG. 1, along line A–B.

FIG. 2 shows a fragmentary cross section A-B of FIG. 1, in which the arrangement of the segments 29 between the spirals 23 of the transport screw and the bores 30 disposed between the segments in the spirals are represented. The segments within the mixing and contact zone A, in conjunction with the difference in speed between the drum barrel 8 and the screw 10, provide for a continuous turbulence in the liquids flowing against one another, and thus for a sufficient exchange of substances.

The bores 30 provided in the spirals additionally produce a liquid exchange between the spirals. By the possibility of regulating the difference in speed during operation, the turbulence effect and the mixing effect associated therewith can be varied.

FIG. 3 shows a special embodiment of the extractor, in which a special drying zone D is provided within the drum, for the purpose of discharging the centrifugally separated solids separately from the specifically heavier liquid, in dry form.

While in this arrangement the specifically heavier liquid is carried out through the outlet connection 35, annular channel 36 and the outlet connection 37, the solid matter arrives in a drying zone D, formed of a prolonged drum jacket 9a and a prolonged transport screw 10a, which discharges the solid matter in dry form through the outlet apertures 38, annular channel 39, and outlet connection 40.

To better show the course of the liquid and the level of the liquids within the drum, appropriate directional arrows and shadings have been used in the drawing.

SUMMARY

The invention provides an improvement in a continuously operating counterflow centrifugal extractor suitable for extraction of a specifically heavier liquid containing solids with a specifically lighter liquid by mixing and separation of the two liquids comprising a drum 8, 9 rotatably mounted on a horizontally extending axis, means within the drum defining a mixing and contacting zone A for the extraction, inflow means 16,17 for the specifically heavier liquid and inflow means 18,19 for the specifically lighter liquid for the introduction of the two liquids to the mixing and contacting zone for counterflow therethrough, a clarifying zone C within the drum disposed on one side of the mixing and contacting zone for receiving and clarifying the specifically heavier liquid from the mixing and contacting zone, outflow means 20 for clarified specifically heavier liquid from zone C, a clarifying zone B within the drum disposed on the other side of the mixing and contacting zone for receiving and clarifying the specifically lighter liquid from the mixing and contacting zone, and outflow means 21,25 for clarified specifically lighter liquid from zone B. The improvement comprises the drum tapering along the length of the means for clarifying of the specifically heavier liquid, i.e. zone C, toward the outflow means 20 for the clarified specifically heavier liquid, a transport screw 10 mounted coaxially in the drum for rotation at a different rate than the rotation of the drum serving as said means defining a mixing and contacting zone, and serving as said specifically heavier liquid clarifying means, said transport screw having a taper corresponding to said taper of the drum in the area of the means for clarifying of specifically heavier liquid, i.e. in zone C, and contacting means 29 between the spirals 23 of the transport screw 10 in the mixing and contacting zone for promoting the mixing and contacting therein.

What is claimed is:

1. In a continuously operating counterflow centrifugal extractor suitable for extraction of a specifically heavier liquid containing solids with a specifically lighter liquid by mixing and separation of the two liquids comprising a rotatably mounted drum, means within the drum defining a mixing and contacting zone for the extraction, inflow means for the specifically heavier liquid and inflow means for the specifically lighter liquid for the introduction of the two liquids to the mixing and contacting zone for counterflow therethrough, means within the drum disposed on one side of the mixing and contacting zone for receiving and clarifying the specifically heavier liquid from the mixing and contacting zone, outflow means for clarified specifically heavier liquid from the specifically heavier liquid clarifying means, means within the drum disposed on the other side of the mixing and contacting zone for receiving and clarifying the specifically lighter liquid from the mixing and contacting zone, outflow means for clarified specifically lighter liquid from the specifically lighter liquid clarifying means, the improvement which comprises the drum tapering along the length of the means for clarifying of the specifically heavier liquid toward the outflow means for the clarified specifically heavier liquid, a transport screw mounted coaxially in the drum for rotation at a different rate than the rotation of the drum serving as said means defining a mixing and contacting zone, and serving as said specifically heavier liquid clarifying means, said transport screw having a taper corresponding to said taper of the drum in the area of the means for clarifying of specifically heavier liquid, said inflow means for specifically heavier liquid being for delivering the specifically heavier liquid to between the screw and the drum at the end of the mixing and contacting zone remote from the means for clarifying of the specifically heavier liquid, said inflow means for specifically lighter liquid being for delivery of the specifically lighter liquid to between the screw and the drum at the end of the mixing and contacting zone adjacent the means for clarifying the specifically lighter liquid, and contacting means between the spirals of the transport screw in the mixing and contacting zone for promoting the mixing and contacting therein.

2. Centrifuge of claim 1, said contacting means comprising a plurality of spaced segments.

3. Centrifuge of claim 2, the segments being removable.

4. Centrifuge of claim 1, the transport screw having bores adjacent the periphery of the spirals in the mixing and contacting zone.

5. Centrifuge of claim 2, the transport screw having bores adjacent the periphery of the spirals in the mixing and contacting zone.

6. Centrifuge of claim 1, the outflow means for the clarified specifically lighter liquid comprising a pump, the pump being connected to the transport screw for rotation therewith.

7. Centrifuge of claim 6, a discharge line for receiving output of the pump, and a throttling member in the discharge line.

8. Centrifuge of claim 7, the transport screw having bores adjacent the periphery of the spirals in the mixing and contacting zone.

9. Centrifuge of claim 1, the outflow means for the clarified specifically lighter liquid comprising a throttling member.

10. Centrifuge of claim 1, the drum tapering along the means defining the mixing and contacting zone toward the specifically lighter liquid clarifying zone, and the transport screw having a taper corresponding to said taper of the drum in the area of the mixing and contacting zone.

11. Centrifuge of claim 10, said contacting means comprising a plurality of spaced segments.

12. Centrifuge of claim 11, the segments being removable.

13. Centrifuge of claim 10, the transport screw having bores adjacent the periphery of the spirals in the mixing and contacting zone.

14. Centrifuge of claim 11, the transport screw having bores adjacent the periphery of the spirals in the mixing and contacting zone.

15. Centrifuge of claim 10, the outflow means for the clarified specifically lighter liquid comprising a pump, the pump being connected to the transport screw for rotation therewith.

16. Centrifuge of claim 15, a discharge line for receiving output of the pump, and a throttling member in the discharge line.

17. Centrifuge of claim 16, the transport screw having bores adjacent the periphery of the spirals in the mixing and contacting zone.

18. Centrifuge of claim 10, the outflow means for the clarified specifically lighter liquid comprising a throttling member.

* * * * *